United States Patent [19]
Goldberg

[11] Patent Number: 5,018,073
[45] Date of Patent: May 21, 1991

[54] HIGH DENSITY LOADED SORTING CONVEYORS

[75] Inventor: Stanley Goldberg, Roseland, N.J.

[73] Assignee: Goody Products, Inc., Kearny, N.J.

[21] Appl. No.: 326,675

[22] Filed: Mar. 21, 1989

[51] Int. Cl.$^5$ .............................................. G06F 15/46
[52] U.S. Cl. .................................... 364/478; 209/563; 209/651
[58] Field of Search ...................... 364/478; 198/372; 209/563, 564, 565, 566, 651, 652, 653, 654

[56] References Cited

U.S. PATENT DOCUMENTS

| | | | |
|---|---|---|---|
| 3,212,623 | 10/1965 | Griffith | 198/372 |
| 4,168,828 | 9/1979 | McLear | 364/478 |
| 4,214,663 | 7/1980 | Schopp et al. | 198/372 |
| 4,249,661 | 2/1981 | Lem | 209/564 |
| 4,672,553 | 6/1987 | Goldberg | 364/478 |

Primary Examiner—Jerry Smith
Assistant Examiner—Patrick D. Muir

[57] ABSTRACT

The disclosed sorting conveyor and method of operating sorting conveyors provide for greater utilization of the apparatus, by using different separations between any leading article and its trailing article, either close separation of the articles when the leading article is to remain on the conveyor while its trailing article is being diverted or wide separation when the leading article is to be diverted while its trailing article remains on the conveyor; and when the sorting conveyor is applied to order-filling, the article discharge points can be chosen for the various kinds of articles so as to increase to a maximum the occurrence of small article-to-article separations.

20 Claims, 4 Drawing Sheets

HIGH DENSITY LOADED SORTING CONVEYORS

The present invention relates to sorting conveyors.

In a common form of sorting conveyor, units or articles to be sorted are conveyed along a path from a lead-in location to discharge locations distributed along the path. "Unit" or "article" here means a separate item, carton or package of one or more articles that is handled as a physical entity separate from others. A discharge location is designated for each unit at the lead-in portion of the conveyor for controlling diverters at the discharge locations. Each unit is tracked as it is carried from the position where its discharge designation is assigned until it is ejected at its designated discharge location. A sorting conveyor of this kind is disclosed in my U.S. Pat. No. 4,672,553.

A factor to be considered in appraising a sorting conveyor is its capacity or "through-put", i.e. the number of units the apparatus can sort per minute, per hour, etc. Comparing two conveyors of equal cost, the one having higher through-put is more cost-effective. An object of the present invention is to increase substantially the through-put of sorting conveyors with little if any increase in the cost of the apparatus.

In a sorting conveyor, a substantial separation is allowed between each unit and its next-following or "trailing" unit. The conveyor carries any "trailing" unit at full speed behind its next-ahead or "leading" unit. Any one diverter may be in operation to remove or eject the "leading" unit; and during the time taken by the diverter in executing its cycle, the "trailing" unit is being carried forward. The "trailing" unit on the conveyor is routinely spaced behind its "leading" unit far enough for the diverter's cycle to be complete before the "trailing" unit enters the operating range of the diverter. Because of that substantial unit-to-unit separation, the diverter does not disturb the positioning of the "trailing" unit on the conveyor, thus avoiding disturbance of the tracking system that controls discharge of the units by the diverters.

In the novel sorting system, the traditional relatively large unit-to-unit spacing is retained for only those units which are to remain on the conveyor while their respective leading units are being discharged from the conveyor. In the novel system, trailing units are placed close to their leading or next-ahead units in those instances where the leading unit is to remain on the conveyor while the next-following or trailing unit is to be discharged from the conveyor. The close-spaced units could touch each other, in concept. However, some unit-to-unit spacing is needed for detecting each unit at various points in its travel, because any two units that are in abutment would be recognized as a single unit by usual detectors.

The selective close-spaced or widely separated condition of the articles can be accomplished in various ways. As a distinctive aspect of the illustrative embodiment of the invention that is detailed below, the articles are deposited in close-spaced relationship on a lead-in portion of the conveyor. Uniform operation of the lead-in portion maintains the close spacing of the articles as they move onto the sorting conveyor portion. Wide separation between two articles is established by retarding the lead-in conveyor that carries a trailing article while the article just transferred to the sorting conveyor portion continues to travel onward.

Providing respective large and small separations between successive units on a sorting conveyor as described above represents one aspect of the invention. In that way the average number of units on the conveyor or "conveyor loading" can be increased as compared with conveyor loading where only large unit-to-unit separation prevails. Greatest advantage of the large-and-small separation between units on the conveyor is realized pursuant to a further aspect of the invention.

In the sorting system of my '553 patent, those articles needed collectively for a group of orders being processed are loaded onto a lead-in conveyor portion. The articles bear codes that identify the variety of each article (unlike systems on which the articles bear sort-location codes). The articles are carried past a scanner. The stored orders of the group are tested in a prescribed sequence to discover respective orders that require the successively scanned articles. (A few prescribed sequences are described in my '553 patent.) When one order has been identified which "needs" any particular article, that article is allocated to the order, and the sort location for that article is designated, being entered in the apparatus that selectively controls the article diverters.

Maximum conveyor loading in that kind of sorting conveyor is achieved here by a process and by apparatus that involve searching the stored order data in a particular search routine. During ongoing operation of a conveyor that carries a succession of articles to be sorted, the order data is searched to locate that order which has a requirement for articles of the same variety as a newly scanned article, and which has a related diverter that is (a) farthest from the scanner or the supply end of the conveyor's sorting segment, yet (b) nearer to the scanner than the diverter designated to discharge the last-previously scanned article. When that order has been thus located which "needs" the newly scanned article, that article is designated to be discharged by the diverter related to the located order.

At some point in the search routine, no order "needing" the last-scanned article is located whose diverter is nearer to the supply end of the sorting conveyor segment than the last-previously designated diverter. The search routine is then resumed for locating an order "needing" the newly scanned article which has a related diverter farthest from the scanner or the supply end of the conveyor's sorting segment; and the search routine continues in the same decreasing sequential manner as before with respect to articles on the conveyor, for locating each order that "needs" each article and has a related diverter that is farthest from the scanner yet nearer to the scanner than the last-previously designated diverter.

Various arrangements are contemplated for storing the data of the orders to be searched. That data includes the requirements of the orders in terms of the kinds and quantities of the articles needed in each order as well as designations of the orders themselves. In one arrangement, the stored data is organized so that the orders are the primary search criterion and the requirements of each order for various kinds and quantities of articles are subsidiary stored data. Alternatively, the stored data may be organized so that the various kinds of articles that are required collectively for all of the orders being processed are the primary criterion and, for each variety of those articles, the orders having requirements for those varieties of articles are subsidiary stored data.

The stored data is assumed here to include designations of the orders in a rising sequence that corresponds to the rising sequence of the order-related diverters that are located progressively farther from the scanner. Regardless of how the stored data is organized with respect to the primary and secondary criteria, the search routine is basically the same, being what is here called a "loop decreasing-sequence search routine". In either of the above arrangements of stored data, each located order is one having the highest diverter in the sequence which is next-below the last-previously designated diverter, and the located orders for successive scanned articles are lower in sequence; and when no still-lower order can be found "needing" a newly scanned article, the search in the decreasing order sequence is resumed, as a loop, with the highest order of the sequence. Special-case adaptations of the general loop decreasing-sequential search routine are considered below, for taking into account the first-scanned article at the start-up of operations and for taking into account a scanned article for which there is no requirement in the stored data.

In the presently preferred apparatus, close spacing is routinely established between articles which have successively lower diverter designations. When the search routine resumes (as a loop) at the high end of the order sequence, the conveyor responds to the designation of a diverter that is higher than or equal to the last-previous diverter designation: the conveyor then establishes a large or wide separation between that trailing article and its leading article. It should be recognized that the resumption of searching at the high end of the sequence of orders leads to a diverter designation that is higher than or (rarely) equal to the last-previously designated diverter. Thereafter, each designated diverter, once again, is lower in the sequence than the last-previously designated diverter. The control of the conveyor which establishes small and large article separations is such that progressively lower diverter designations result in small article-to-article separations while the inverse, a higher diverter designation than the last-previous designation, results in a large article-to-article separation.

Accordingly, the typical result of the loop decreasing-sequential search routine is to establish a succession of close article-to-article separations, then a large separation, and another succession of close separations, and so forth. A considerable increase in conveyor loading and through-put is achieved. An increased utilization of the sorting conveyor system of as high as 40% may be achieved by eliminating any "large" article-to-article separations that are not needed.

The small and large separations of the articles on the sorting portion of the whole conveyor is accomplished in the illustrative apparatus detailed below by arranging close spacings of articles on a lead-in portion of the whole conveyor that transfers the articles to the sorting portion, routinely operating the lead-in conveyor portion and the sorting portion continuously when the close spacings are to be maintained and, when large article-to-article separations are to be established, delaying the lead-in conveyor portion while operation of the sorting conveyor portion continues at its normal speed. A trailing article on the lead-in conveyor portion is delayed and thus has increased separation from its leading article. During the delay, the leading article is being carried forward by the continuously operating sorting portion of the conveyor.

An illustrative scanner-controlled sorting conveyor is represented in the accompanying drawings and described in detail below, being the presently preferred embodiment of the invention.

Figure 1:
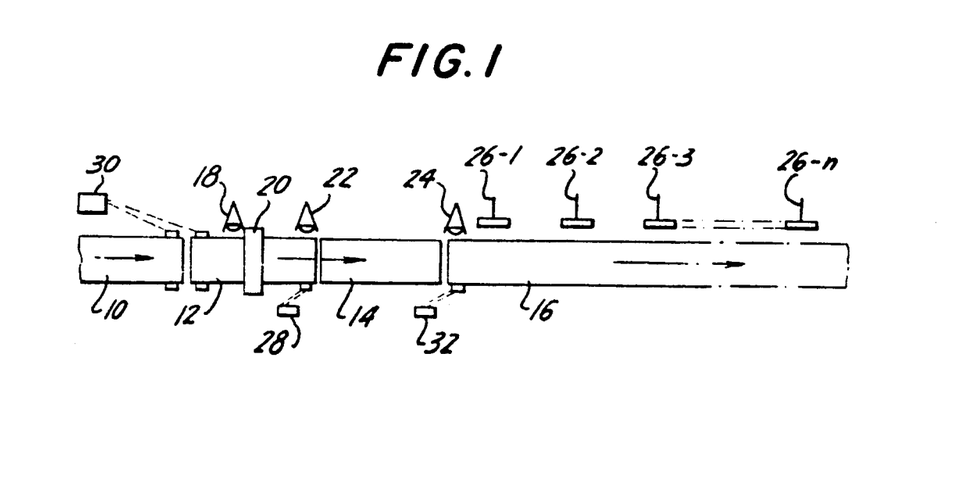
FIG. 1 is a diagrammatic plan view of sorting conveyor apparatus, being part of an illustrative embodiment of the invention.
Figure 4:
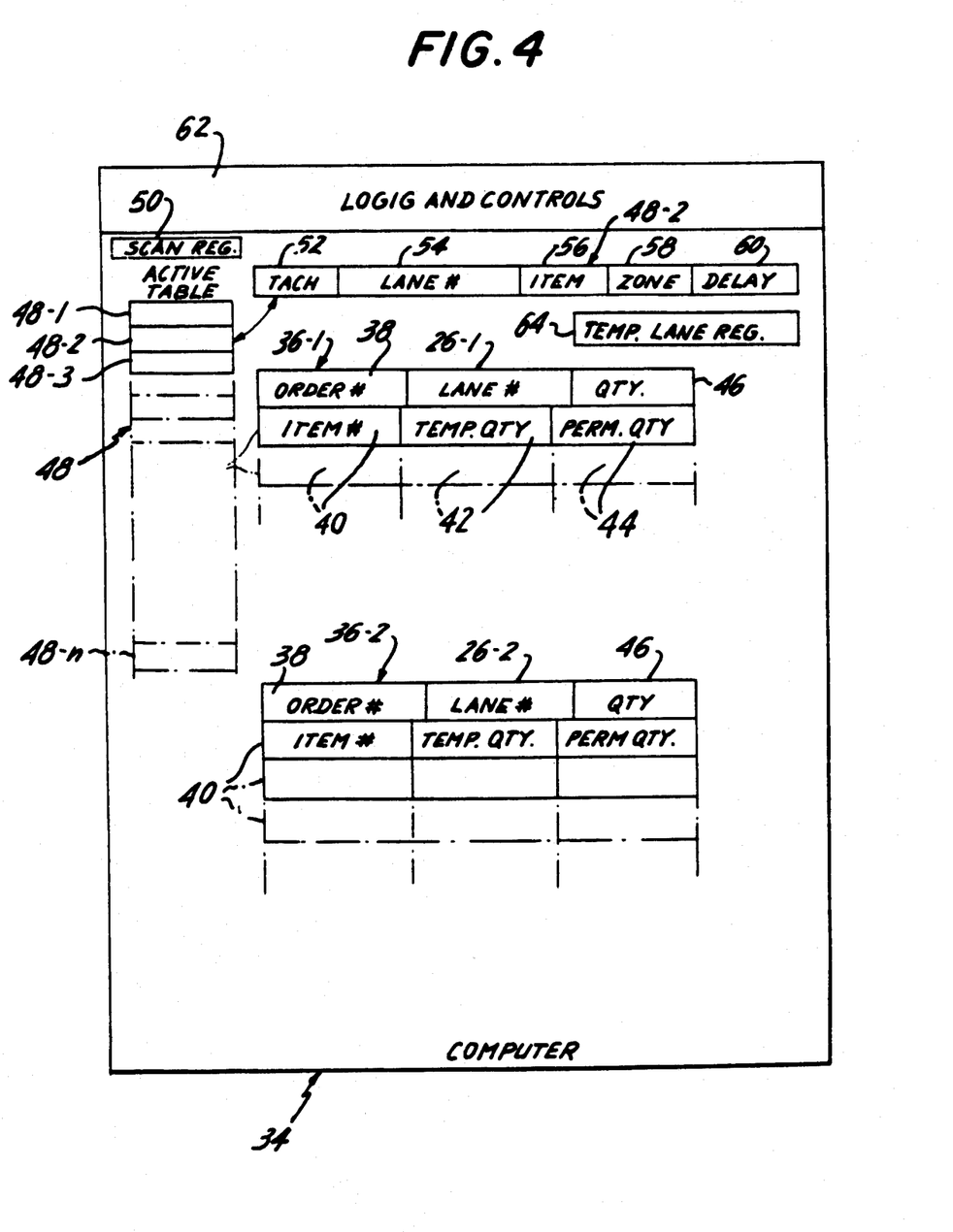
FIG. 4 is a diagram of a computer forming part of the sorting conveyor system of FIG. 1.

The conveyor apparatus of FIG. 1, together with its control computer represented in FIG. 4, form an illustrative embodiment of the novel sorting conveyor system.

In FIG. 1, there are four segments of the article transporting portion of the apparatus. Articles such as boxes are deposited manually or otherwise on loading conveyor segment 10. The boxes are moved in the direction of the arrow onto scanner conveyor 12. These two conveyor segments are belt conveyors, for example, which are coupled to each other and driven by a motor or motors Ordinarily, the boxes travel slightly faster on the scanning conveyor than when the boxes are on the loading conveyor. This arrangement, as is well known, causes boxes that may abut one another when on the loading conveyor 10 to become separated. This separation is introduced for providing assurance that photoelectric or other detectors will respond to each box separately, whereas two boxes in end-to-end abutment would not ordinarily be distinguished by a photodetector from one long box.

Segments 14 and 16 of the apparatus, two belt conveyors for example, receive the boxes from scanner conveyor 12 and carry the boxes farther along the path represented in FIG. 1 by the arrows. Segment 14 is a transfer conveyor that carries the boxes from segment 12 to sorting conveyor 16.

Belt conveyors 10 and 12 have a common drive so that they operate alike; they can be slowed down in unison (continuing to operate at slightly different speeds) or they can operate at a creep or even stop, depending on the provided drive mechanism and its controls. Transfer conveyor 14 has its separately controlled drive. Finally, sorting conveyor 16 also has its separate drive. The whole conveyor comprises a lead-in portion 10 and 12 that delivers boxes to the supply end of sorting conveyor portion 14 and 16. The reasons for the various drives are explained below.

Boxes on scanner conveyor 12 are carried past an entry eye 18 and a code scanner 20. The entry eye 18 renders scanner 20 effective to enter one article code for each box or other unit that passes the scanner even though the scanner may execute many scans of each passing article. An exit eye 22 is provided at the transfer point between segments 12 and 14, for functions described below. A further eye 24 at the entry end of sorting conveyor 16 represents one of a series of such eyes distributed along the sorting conveyor, useful in tracking the boxes.

A series of pushers 26-1, 26-2, 26-3, etc., are distributed at successive discharge locations along the sorting conveyor. The numerical designations "1", "2", "3", etc., as part of their identifying characters correspond to the positions of the pushers at progressively greater distances from the supply or scanner end of the sorting conveyor. These pushers represent any of a wide variety of diverters that may be used for selectively discharging boxes or other articles from the conveyor. Pushers that are as represented in the drawing are highly effective diverters.

A tach-pulse generator 28 is operated by conveyor 12. It produces a train of pulses representing incremental advance of that conveyor. Drive mechanism 30 operates conveyor segments 10 and 12 coordinately, as described above. Another tach pulse generator 32 is operated by sorting conveyor 16, and produces a train of pulses that represent incremental advances of the sorting conveyor portion 14, 16.

Articles such as cartons, boxes and packages of various kinds; separate articles or packages of multiple articles are carried past scanner 20; the diverters that are to discharge those articles are designated and the moving articles are tracked along the path of the arrows until they reach diverters 26-1, 2, 3 . . . distributed along the sorting conveyor 16. Various tracking arrangements are known that may be used. The tracking provisions in U.S. Pat. No. 4,671,553 used as part of the apparatus of FIG. 7 of that patent are suitable for use herein and are incorporated here by reference.

Figure 2:
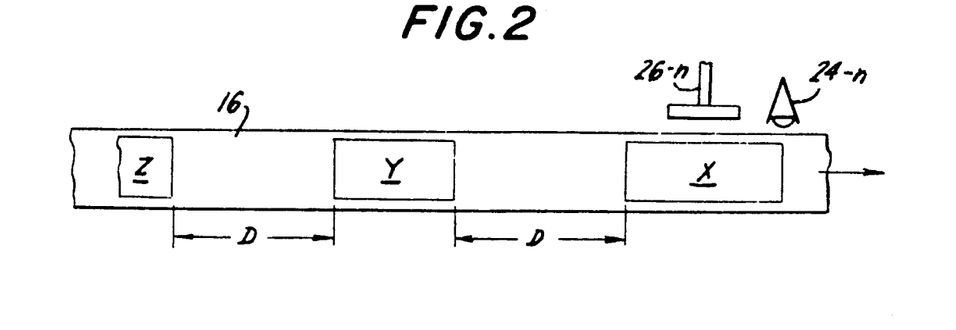
FIG. 2 is a diagram representing a portion of a conventional sorting conveyor system.

Boxes may be carried by conveyor 16 past diverter 26-n in FIG. 2, representing any pusher or other diverter represented in FIG. 1. Eye 24-n represents one of a series of eyes forming part of the tracking system. That eye may trigger the operation of the diverter, for discharging the box opposite the pusher. Even though the operation of the pusher is extremely fast, its operating cycle time must nevertheless be taken into account, especially when a high-speed conveyor is used. While an article X is being discharged and then, while the pusher is being withdrawn for restoring it to the starting condition for its next cycle, the conveyor is propelling the next-following or trailing article Y forward. A relatively large distance D should be allowed between articles X and Y, to be sure that the cycle of operation of diverter 26-n will not disturb the tracking of the next-following article on the conveyor. Ordinarily, the same relatively large distance D is allowed, as a minimum, between articles Y and Z, and between each leading article on the sorting conveyor and the next-following or trailing article.

Pursuant to the present invention, uniformly large separations D between successive articles on a sorting conveyor are not allowed. Instead, as represented in FIG. 3, large separations D are required in only some instances, whereas much smaller separations d are feasible in many other instances.

Figure 3:
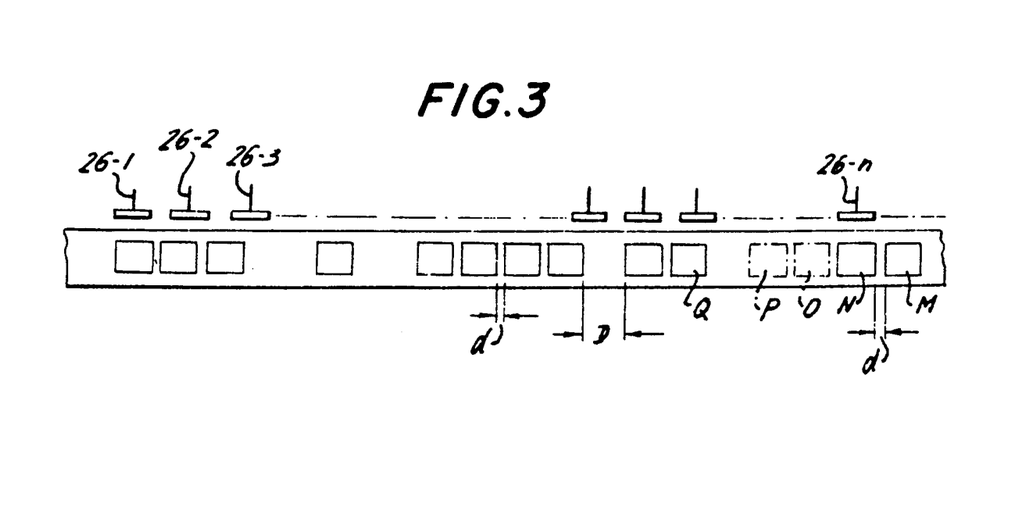
FIG. 3 is a top plan view of a portion of the apparatus in FIG. 1, including articles on the conveyor.

In FIG. 3, diverter 26-n is shown opposite box N. There is only a small separation d between leading box M and box N that trails after box M. And yet diverter 26-n can safely divert box N. During that diverting cycle, box M is carried forward in the direction of the arrow. The position of box M on the conveyor is undisturbed by diverter 26-n in its cycle of operation.

Box O is shown in dotted lines as the trailing box that next follows its leading box N. The dotted-line representation of box 0 is intended to indicate discharge of box 0 earlier along the travel of those boxes. Boxes 0 and N were originally placed close together on the conveyor, based on the advance knowledge that box N was to be the leading box at a time when its trailing box 0 was being discharged from the conveyor. FIG. 3 also shows box P in dotted lines to indicate that box P was initially placed close to box 0, further signifying discharge of box P while its leading box 0 was still on the conveyor. That boxes M, N, 0 and P can be close-spaced represents a distinct gain in the utilization of the conveyor. Without increasing the speed of the conveyor or changing the diverters in any way, the through-put of the sorting conveyor is greatly increased.

The relatively large space D was initially provided between boxes P and Q. This is because box P was discharged earlier, at a time when box Q was still on the conveyor. This large space D provides assurance that the positioning of box Q on the conveyor would not be disturbed while box P was being discharged and while its diverter was being restored to its starting condition and ready to discharge a next-following box.

The sorting conveyor in FIG. 7 of the patent '553 is modified here to attain the high-density loading of the conveyor represented in FIG. 3. Referring once again to FIG. 1, it may be considered that conveyor segments 14 and 16 continue at all times to operate in unison and at constant speed. By proper control of drive 30, conveyor segments 10 and 12 can operate at a normal speed, and boxes can be loaded onto the conveyor so that they are delivered to conveyor segment 14 close-spaced. However, whenever a large space D is to be established between two boxes, this can be accomplished by slowing conveyor segments 10, 12 to a creep or stopping those segments for a controlled interval while maintaining conveyor segments 14 and 16 in operation at their normal speed. Segments 10 and 12 form a lead-in conveyor portion that extends to sorting conveyor portion 14, 16.

The same apparatus and procedure are used here in processing orders as in my '553 patent. Orders of a group are stored in a computer 34 (FIG. 4); the stored orders are designated 36-1, 36-2... in FIG. 4. Those stored orders contain stored data including a number 38 that includes: the actual number of each order and the suffix character 1, 2,... of the designations 36-1, 36-2...; each ordered item 40, represented by its code; a temporary quantity register 42 for each article; a permanent quantity storage 44 representing the number of each variety of article actually in the order; and an entry 46 representing the total number of units of all varieties needed to fill each order. The suffix characters 1, 2, etc. of the stored orders 36-1, 36-2, etc., correspond to the suffix characters 1, 2, etc. of the lane designations 26-1, 26-2, etc. The sorting conveyor operates in such a manner that articles listed in the stored orders are discharged from the conveyor at a lane or an order assembling and packing location, where the suffix numbers of the order number and the lane correspond. It may be desirable to assign two or more order assembly lanes or locations for certain orders that are particularly large, but that is an unusual variant that needs no discussion here. Accordingly, the suffix numbers of the orders and their related diverters form an ascending numerical sequence starting with "1" that represents the diverter nearest to the lead-in portion of the conveyor and the scanner.

The computer provides storage for other data. Register 50 stores each newly scanned article code, supplied by scanner 20. The computer also includes an active table 48 that provides at least as many positions 48-1, 48-2, 48-3...48-n as there are articles on the conveyor system at any time.

FIG. 4 includes a large-scale diagram of position 48-2, representing each table position. The typical table position includes a tach pulse register 52; a lane number (suffix) register 54; a register 56 for storing the code of a respective one of the articles to be sorted; zone register 58; and a delay register 60. Tach register 52 and zone register 58 are utilized with lane register 54 in tracking each article from the time it is scanned and its discharge lane is designated until that article reaches that designated discharge lane or diverter. The tracking system disclosed in the '553 patent may be used here; its description is incorporated here by reference. As is apparent, that tracking system may be modified, and substitutes may be used, inasmuch as any suitable system may be used for controlling the discharge of each article at its designated lane or diverter location.

Figure 5:
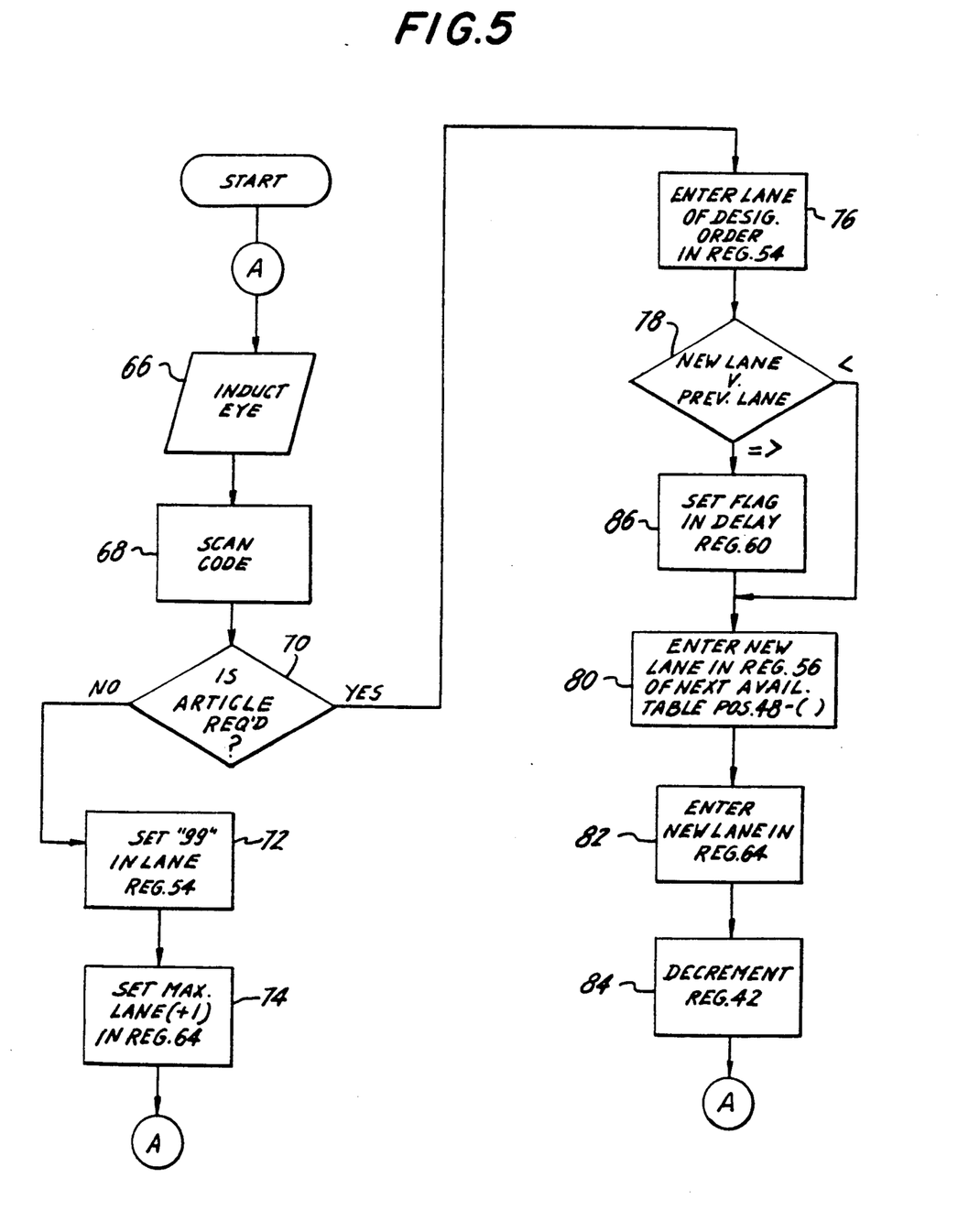
FIG. 5 is a flow chart for a portion of the apparatus of FIGS. 1 and 4.
Figure 6:
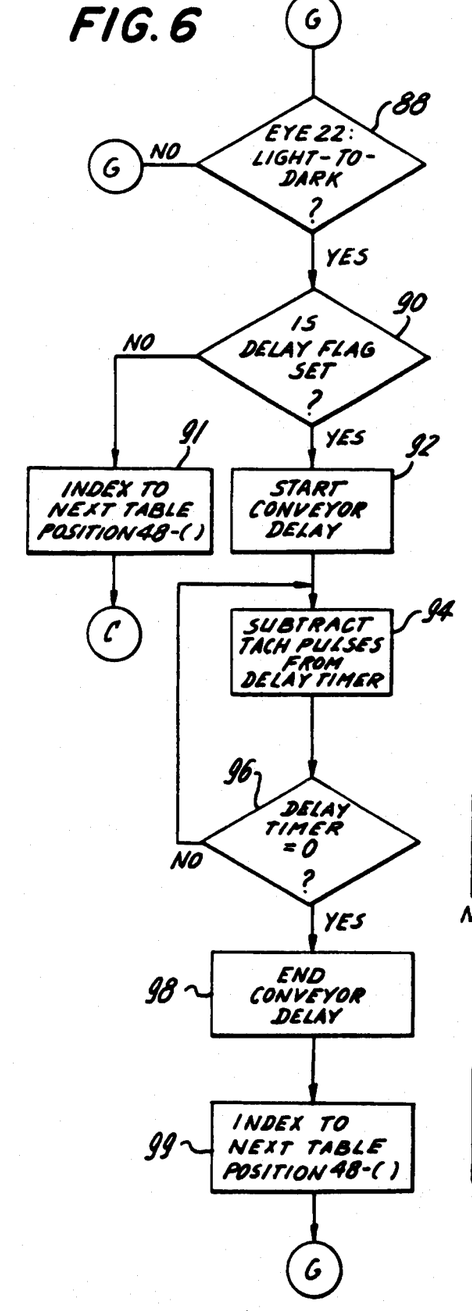
FIG. 6 is a flow chart of a subroutine performed in the apparatus of FIG. 4.
Figure 7:
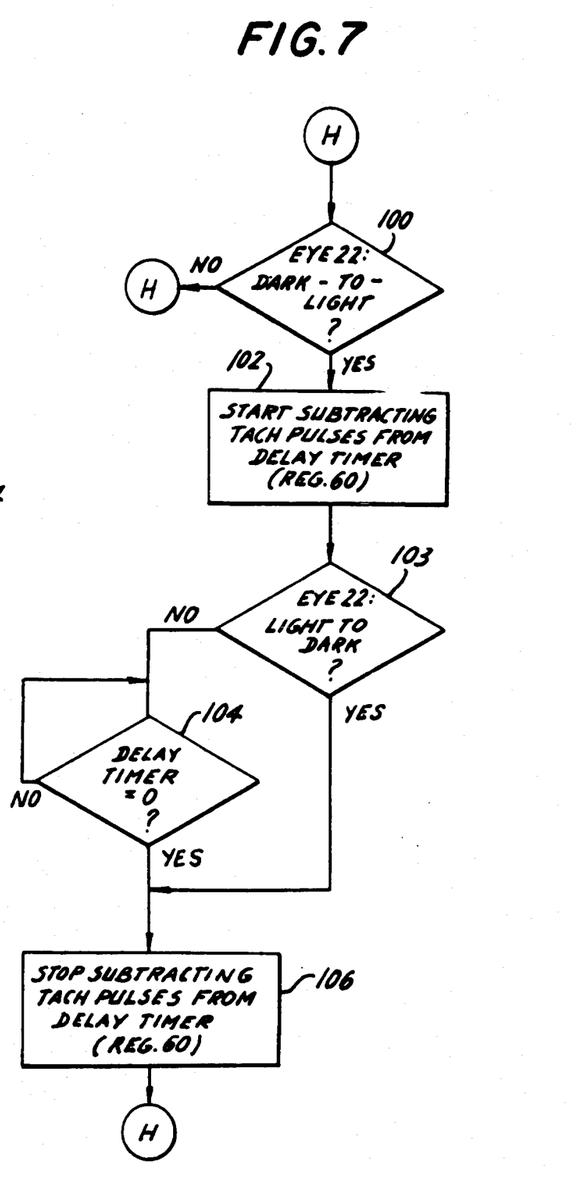
FIG. 7 is a flow chart of a subroutine for the apparatus of FIG. 4, the flow chart of FIG. 7 being useful with that of FIG. 6 as a modification.

The computer also includes a "logic and controls" section 62 that performs auxiliary and internal programmed operations, part of which are represented in the flow charts of FIGS. 5, 6 and 7. The computer may also be used to generate a "pick list", being a composite of all the articles needed to fill all of the orders. All of those articles (such as boxes) are collected—recognizing that some articles may be out of stock—and they are deposited on the conveyor close together, even touching.

The diagram of FIG. 4 represents one manner of organizing the significant data involved in tests of whether a just scanned article is needed for any particular order. The orders are distinguished according to their suffix numerals "1", "2", etc., corresponding to their related diverters 26 that have the same series of suffix numerals and their order assembly locations. Those suffix numerals increase in accordance with increasing distances from the supply end of the sorting conveyor, i.e., the end of the sorting conveyor nearest to the scanner. An article is needed for any particular order (and for its related order assembly location) if two conjoint tests are met in relation to each scanned code, (a) the order identification, and (b) the inclusion in the order of an article code plus a quantity requirement in register 42. That data is diagrammatically represented in FIG. 4 as involving a test of successive orders and a search in each tested order for the needed article (its code and a quantity requirement). In an alternative arrangement of the data to be searched, all the articles listed in the actual orders can be arranged in numerical sequence of their codes and, for each article, the orders needing those articles can be listed in accordance with the order-suffix numbers together with a register to show that an initial quantity requirement has not been met in the ongoing operation of the system. Regardless of which organization of data may be used, that data is searched for the conjoint factors of (a) an article code in an order matching the code of the just-scanned article, and (b) search of the orders in a prescribed sequence to designate one order that requires that article. Where the data is arranged in the computer in the manner represented in FIG. 4, the orders form a primary criterion in a search routine to locate one order of the sequence having a requirement for the same variety of article as the newly scanned article, and the article variety is a secondary search criterion. Where the data is arranged to provide a sequence of article codes in the "pick list", the variety of the article is the primary search criterion and the sequence of orders having a quantity requirement for each respective variety of article is the secondary search criterion. For both arrangements of the stored data, a search of that data starts at a particular point in the sequence of orders to locate an order having a requirement for the newly scanned article whose code is temporarily stored in register 50. When the order is located, its related lane number—the same as the diverter number—is entered in the next available table position 48-( ) that thereby becomes assigned to that newly scanned article.

The specially advantageous search routine for locating an order having a requirement for the variety of article corresponding to each newly scanned article is here called a "loop descending-sequence search routine". The orders form an ascending sequence in accordance with the increased distances from the scanner of their related diverters. In the search routine, the orders are searched in descending sequence. During ongoing operation of the apparatus, a number is stored in register 64 that represents the order and its related diverter that were designated for the last previously scanned article. The loop descending-sequence search routine is performed to locate that order having a requirement for the newly scanned article, starting with the order whose diverter is, in the sequence, just below the diverter stored in register 64, searching the stored order data in inverse sequence to the lowest end of the sequence; and if no such order is located, continuing the descending-sequence search routine as a loop, starting at the end of the sequence (representing the diverter most remote from the scanner) and continuing downward to locate an order (if any) that has a requirement for the just-scanned article. The term "loop descending-sequence search routine" is useful as a brief identification of the described sequence of order testing. When the apparatus has just been started in operation, there is no stored number in register 64, and then the descending-sequence search is best started at the high end of the sequence.

When the apparatus is to be set in operation, some of the articles to be distributed to the sort locations are loaded onto supply conveyor 10. The START block of FIG. 5 is activated, operation of conveyors 10, 12, 14 and 16 is started, and a number is entered into register 64 that is one unit higher than the largest suffix number of the orders and their related diverters.

An interrupt is developed in block 66 when the first article comes into range of scanner 20, and the interrupt drops to block 68 for entering the scanned article code into register 50 and into register 56 of the first position 48-1 of active table 48.

The interrupt drops to decision block 70 and initiates a sequence of conjoint tests of the stored orders and the quantity and variety of the order requirements. This sequence of comparisons starts with the order next-below the number in register 64 (FIG. 4). For the first scanned article, the stored number is one unit higher than the number of the diverter most remote from the scanner.

For the first box that is scanned, it would be most remarkable if it were not needed for any of the orders; that article would have been picked from inventory in error. A "no" decision from block 70 drops to block 72 for setting a flag "99" in the lane register 54 of the first active table position 48-1. (This "99" is any number higher than the number of diverters used.) That would cause discharge of the article from the remote end of sorting conveyor 16. At the same time, the interrupt to block 74 results in entry into register 64 of a number that is one higher than the number assigned to the diverter most remote from the scanner.

Ordinarily, the first article that is scanned is needed for one of the orders. A "yes" decision of block 70 indicates that an order has been located having a requirement for the scanned article. The interrupt from block 70 to block 76 results in entry of the lane number of the located order into the lane register 54 of the first position 48-1 of the active table. That lane number is compared with the number stored in register 64, as represented by decision block 78. For the first scanned article, its designated lane is inevitably less than the number initially entered into register 64, so an interrupt drops from block 78 via its "less than" path to blocks 80, 82 and 84 in succession, for entering a lane designation in register 54 of the first position 48-1 of the active table 48, to enter the same lane number in register 64, and to decrement register 42 in the located order by one unit of the same variety of article as that whose code is newly stored in register 50.

At some point in the successive designations of lanes for the successively scanned articles, the order/article search sequence will start with a low-numbered lane, and no lower-numbered order has a requirement for that article. After the descending sequential search procedure reaches level "1", the search sequence resumes with the order having the highest suffix number. Thereafter, assuming that an order is found that has a requirement for the newly scanned article, that order will have a suffix number higher than or equal to the designated lane number of the last-previously scanned (leading) article. That designation of a higher number for the newly scanned (trailing) article signifies that it will remain on the conveyor while its leading article is being diverted. The interrupt from the greater-than-or-equal path to block 86 results in a delay number being entered into delay register 60 of its corresponding table position 48-n; and as before interrupts dropping to blocks 80, 82 and 84 result in a lane entry in register 54 of the same active table position 48-n, entry of that lane number in temporary lane register 64, and in decrementing by one unit the quantity requirement register 42 of that variety of article in the designated order/discharge lane.

FIG. 6 is a subroutine that runs continuously. When the first article reaches eye 22 located at the end of scanner conveyor 12, an interrupt from the "yes" path from decision block 88 drops to decision block 90. This block tests register 60 of the first active table position. If no delay number is found in register 60, the interrupt from the "no" path of block 90 drops to block 91 to index the next table position 48-2 for receiving entries related to the next article, and the subroutine returns to G. This subroutine is followed for the second and each other article.

Let it be assumed that the first five articles on the conveyor are articles M-N-0-P-Q (FIG. 3). The first five active table positions 48-1, 48-2, ... 48-5 contain data representing these articles. Articles N, 0 and P are to be discharged at locations that are progressively closer to the scanner. Accordingly, there will be no entry in registers 60 of their active table positions. In each instance, a "no" decision in block 88 results in ongoing operation of the subroutine of FIG. 6.

When article Q reaches eye 22, the interrupt to block 90 results in a "yes" decision because register 60 in the fifth active table position 48-5 signals the condition of article Q remaining on the conveyor while and after article P is discharged. A "yes" decision results in an interrupt to block 92 which causes the control mechanism of conveyors 10 and 12 to slow to a creep or stop. Conveyors 14 and 16 continue their full-speed operation, carrying article P on conveyor 14 progressively farther away from article Q on conveyor 12. The interrupt also drops to block 94, resulting in tach pulses from tach pulse generator 32 being subtracted from the number in register 60 of the active table position of article Q. The interrupt from block 94 drops to decision block 96 where the related delay timer 60 is continuously tested until, at zero in register 60, a decision via the "yes" path from block 96 to block 98 results in restoration of conveyors 10 and 12 to their original speeds. The interrupt also drops to block 99 to bring the next table position 48-( ) into effect. The period during which conveyors 10 and 12 were slowed, or stopped, or slowed and stopped, and returned to full speed resulted in article P being separated from article Q by a distance D, increased from the distance d that originally separated articles P and Q. This operation presumes routine placement of the articles on conveyor 12 with minimum spacing d between them. The increased separation between articles P and Q is adjustable largely by choice of the delay number chosen for entry into register 60 when an interrupt drops to block 86 (FIG. 5).

Articles loaded onto conveyor 10 are placed end-to-end for achieving maximum conveyor loading. In practice, conveyor 10 may be loaded manually, and then small or large spaces may well occur between successive articles. The delayed operation of conveyors 10 and 12 may be excessive or entirely unnecessary in those instances where a leading article and its trailing article are spaced far apart on conveyor 12, far enough for the trailing article not to be disturbed while its leading article is being diverted. FIG. 7 is a flow chart of a free-running subroutine that is useful as a supplement to that of FIG. 6, for avoiding unnecessary increases in the separation between a leading article and its trailing article.

In FIG. 7, decision block 100 constantly monitors eye 22 (or a separate eye) at the discharge end of scanner conveyor 12. So long as an article blocks light to the eye, the "yes" decision path gets no interrupts. When the rear or trailing end of a leading article on the conveyor allows light to reach eye 22, interrupts drop via the "yes" path from block 100 to block 102. During that state, pulses from constantrate tach pulse generator 32 are subtracted from the register 60 of that active table position 48-n which represents the trailing article. The interrupt that drops to block 102 also drops to decision block 103 which tests eye 22 to signal return from light to dark, i.e., the appearance of the next article at eye 22. When that next article reaches eye 22 (or a redundant eye), a "yes" decision in block 103 drops to block 106, discontinuing further reduction in the value stored in delay-timer register 60. On occasion, the space between a leading article and a trailing one on conveyor 12 might be more than space D, so there is no need to increase the separation between them, hence no need to slow or stop conveyor segments 10 and 12 before the trailing article on conveyor 12 is transferred to conveyor segment 14. The pulses subtracted from register 60 become zero when the article-to-article separation is equal to space D or is greater than D. Decision block 103 continues to yield a "no" interrupt until eye 22 becomes darkened. Eye 22 does not become darkened during the time it takes for register 60 to reach zero whenever the article separation is greater than D. Difficulties could arise in the computer if the count in a delay timer 60 were allowed to become a negative integer. Block 104 produces a "yes" interrupt when register 60 reaches zero, producing an interrupt to block 106. From that instant, there is no further reduction in the stored count in register 60.

The time interval during which conveyors 10 and 12 are delayed as described in relation to FIG. 6 becomes a reduced time delay interval pursuant to FIG. 7; and if two articles are widely separated as loaded on conveyor 10, the delaying effect of FIG. 6 will be reduced or nullified in the manner described in connection with FIG. 7. The described relationship between the dark-to-light and light-to-dark sensing, and the computer's response serve as a means for gauging the actual separation between a leading article and its next-following article. The gauging means serves as a means for adjusting the stored count in the related register 60 so as to vary (inversely) in accordance with any preexisting separation greater than d between those articles on conveyor 12. The slowed or stopped operation of conveyor lead-in portion 10, 12 for increasing the article separation from d to D continues for a controlled interval that varies in dependence on the gauged separation.

The '853 patent contains a more comprehensive description of the illustrative computer and its functions. For example, register 46 initially contains the total number of items of the order, being the sum of the separate items in registers 44. Register 46 is decremented one unit each time any register 42 of that order is decremented, in this way indicating the number of units in the order that have not been supplied.

Registers 44 are useful in due course to enable the computer to generate a shipping invoice. After the available articles are assembled in accordance with a pick list and sorted as described above, the number of units of each kind of product in registers 44 minus the numbers remaining in the respective registers 42 represent the actual number of items of each kind of product that have been assembled for shipping, for each order. Further details are omitted, as being unnecessary to a full understanding of the present invention.

Brief mention has been made of tracking the articles from the time when a diverter is designated for each article and entered into lane register 54, until the articles are discharged from the conveyor by the designated diverters. When a diverter is designated for a particular article, the zone number and the tach count corresponding to that designated diverter are entered into registers 52 and 58 in the active table position of that article. Eye 24 and others like it initiate a process of decrementing each tach register 52 in response to each pulse from tach pulse generator 32, and those eyes cause zone registers 58 to be decremented as conveyor 16 carries the articles from zone to zone. Further discussion here of the tracking system is omitted, partly because various known tracking systems for sorting conveyor may be used here such as that in my '553 patent or a modification, and because relevant portions of my '553 patent are incorporated here by reference, and finally because tracking is unnecessary to an understanding of this invention.

The foregoing represents an illustrative embodiment of the invention, with modifications. It is evident that other modifications and other applications of that embodiment will be apparent to those skilled in the art. Consequently, the appended claims should be interpreted broadly in accordance with the spirit and scope of the invention.

What is claimed is:

1. A method operating a sorting conveyor that carries articles from a common location to diverters that are distributed along the conveyor at progressively greater distances from the common location, including the steps of preselecting which of the diverters is to remove each article from the conveyor, and establishing either a small separation or a substantially larger separation between each trailing article and its leading article on the conveyor in dependence on whether any trailing article or its leading article is first to be discharged from the conveyor by one of the diverters.

2. The method as in claim 1, wherein the establishment of the separation between the articles includes first establishing small separations between the articles on the conveyor, and increasing the separation substantially between each trailing article and its leading article whenever the leading article is to be removed from the conveyor while its trailing article is to remain on the conveyor.

3. The method as in claim 1, wherein articles on the conveyor are ordinarily disposed close to one another, but which may at random have greater separation between one another, wherein the establishment of said substantially larger separation between any trailing article and its leading article includes delaying such trailing article while sustaining the travel of the leading article, varying the delay to take into account the extent of separation that may exist between the leading article and its trailing article before any such delay.

4. The method of processing a group of orders having requirements for various kinds and quantities of articles by distributing articles at order assembly locations related to the orders including the steps of storing the orders and their requirements in a record, successively loading articles for all the orders on a sorting conveyor, the conveyor having diverters distributed along the conveyor, each of said diverters being related to a different one of said orders, scanning the articles successively, searching the record to locate an order for a newly scanned article which order has a related diverter that is farthest from the scanner among all those diverters that are nearer to the scanner than the diverter related to the order located for the just-previously scanned article, or, if no such order is located, searching the record to locate an order, if any, having a diverter that is farthest from the scanner among the diverters of all the orders having requirements for the newly scanned article, designating a diverter related to the located order for discharging such newly scanned article from the conveyor, and providing increased separation between each trailing article and its leading article if the designated diverted of the trailing article is as remote or more remote from the scanned than the designated diverter of its leading article.

5. The method as in claim 4, wherein the orders and their related diverters form an ascending sequence in accordance with the increasing distances of the diverters from the loading end of the conveyor and wherein a loop descending-sequence search routine is followed for locating an order for each newly scanned article.

6. The method as in claim 4, wherein the conveyor has a lead-in conveyor portion on which the articles are loaded and a sorting conveyor portion along which the diverters are distributed, and wherein the increased separation between a leading article and its trailing article is performed by delaying the lead-in conveyor portion when any trailing article is about to be transferred to the sorting conveyor portion while its leading article is being transported by the sorting conveyor portion.

7. The method as in claim 6, including the step of gauging the separation between a trailing article and its leading article when the separation between those articles is to be adjusted, and delaying the trailing article in dependence on the gauged separation between those articles for avoiding an unnecessary increase in their separation.

8. The method as in claim 4, including the step of assigning a discharge location to any articles on the conveyor that are not required in any of the orders and treating such discharge location as a diverter in the sequence of diverters related to the orders.

9. The method as in claim 4, wherein, for the first article to be processed, before any previous article has been assigned for discharge by a diverter, the search routine is adapted to assign that first article for discharge by that diverter which is farthest from the lead-in portion of the conveyor among all of the diverters related to orders having requirements for that article.

10. Sorting conveyor apparatus including a sorting conveyor portion for carrying articles from a common location along a path to a series of discharge locations, a series of diverters distributed along said path for discharging the articles from the sorting conveyor at said discharge locations selectively, means for predesignating which of the diverters is to discharge each of the articles from the conveyor, means for establishing a minimum separation between each trailing article and its leading article on the conveyor, and means for selectively increasing the separation between any trailing article and its leading article when the diverter predesignated for the trailing article is the same as or farther from the common location than the diverter predesignated for such leading article.

11. Sorting conveyor apparatus as in claim 10 wherein said means for selectively increasing the separation between a trailing article and its leading article includes means for delaying the advance of a trailing article while its leading article is being carried along said path.

12. Sorting conveyor apparatus as in claim 10 wherein said means for selectively increasing the separation between a trailing article and its leading article includes a lead-in conveyor portion at said common location for transferring articles to said sorting conveyor portion, drive means for said lead-in conveyor portion, and delay means for retarding said drive means and thereby increasing the separation between an article about to be transferred to the sorting conveyor portion and the leading article just-previously transferred to the sorting conveyor portion.

13. Sorting conveyor apparatus as in claim 12, wherein the articles are ordinarily disposed close to one another on the lead-in conveyor portion but may at random have greater separation between one another, said means for selectively increasing the separation between a trailing article and its leading article including means for gauging the separation between a leading article and its trailing article while those articles are on said lead-in conveyor portion, said gauging means being arranged to adjust the delay of the delay means for avoiding unnecessary increase in the separation between the trailing article and its leading article.

14. Sorting conveyor apparatus including a conveyor having a sorting portion and a lead-in portion that supplies successive articles to the sorting portion, a series of diverters distributed along the sorting portion of the conveyor, means operative with respect to articles on the lead-in portion of the conveyor for designating the diverters that are to discharge those articles, respectively, from the conveyor, said apparatus including means for selectively increasing the separation between certain trailing articles on the conveyor and their respective leading articles, in those instances where the leading article is to be discharged from the conveyor by a designated diverter before its trailing article.

15. Apparatus for processing a group of orders having requirements for diverse varieties and quantities of articles by distributing the articles from a common supply point to a succession of order-assembly locations, each article bearing a code representing the variety of the article, said apparatus including means for storing orders and their requirements in a record, a conveyor having a lead-in conveyor portion and having a sorting conveyor portion for receiving articles from the lead-in conveyor portion, a scanner at the lead-in conveyor portion, said sorting conveyor portion extending along a path that passes the order assembly locations, a series of diverters that are related to the stored orders and are distributed along said sorting conveyor portion, and means for searching said record to locate an order which has a requirement for a newly scanned article and which order has a related diverter which is farthest from the scanner among all those diverters that are nearer to the scanner than the diverter related to the order located for the just-previously scanned article, or, if no such order is located, said searching means being operative to locate an order, if any, having a diverter that is farthest from the scanner among all the diverters of orders having requirements for the newly scanned article, and means for designating a diverter related to the located order for discharging said newly scanned article from the sorting conveyor portion.

16. Apparatus as in claim 15, wherein the orders and their related diverters form an ascending sequence in accordance with the increasing distances of those diverters from the scanner, and wherein the search means for locating the order meeting the stated criteria is arranged to follow a loop descending-sequence search routine.

17. Apparatus as in claim 15 wherein, when distribution of articles by the apparatus is started, the searching means is arranged to locate an order having a requirement for the first-scanned article and having a related diverter that is farthest from the scanner among all of the diverters related to orders having requirements for the first-scanned article.

18. Apparatus as in claim 15, including means for delaying said lead-in conveyor portion when a trailing article is about to be transferred to the sorting conveyor portion if the diverter designated for the trailing article is as remote or more remote from the scanner than the designated diverter of the just-previously scanned article.

19. Apparatus as in claim 18, including means for gauging the separation between a trailing article and its leading article when the diverter designated for the trailing article is as far as or farther from the scanner than the diverter designated for its leading article, said gauging means controlling said delaying means to avoid unnecessary increase in the separation between the leading article and the trailing article.

20. Sorting conveyor apparatus for distributing articles to order assembly locations in accordance with a group of orders, the articles bearing codes that represent the variety of each article, said apparatus including
   (a) a conveyor having a sorting portion and a lead-in conveyor portion for supplying successive articles to said sorting portion;
   (b) a series of diverters located along said sorting portion of the conveyor at progressively greater distances from said lead-in conveyor portion;
   (c) an article-code scanner at said lead-in conveyor portion;
   (d) control means responsive to said scanner for controlling said diverters selectively, said control means including
      i. means for storing the orders including stored codes representing the varieties of articles required to fill each order, said diverters being related to said stored orders;
      ii. means responsive to said scanner and to said stored orders for designating a diverter, if any, that is to discharge each of the successive articles from the conveyor; and
   (e) means for determining the spacing between the articles supplied to said sorting conveyor portion so that
      i. a small separation is provided between each leading article and its trailing article in each instance where the designated diverter of a trailing article is closer to the lead-in conveyor portion than the designated diverter of the leading article; and
      ii. a substantially larger separation is provided between each leading article and its trailing article in each instance where the designated diverter of the trailing article is the same as or farther from the lead-in conveyor portion than the designated diverter of its leading article.

* * * * *